US008238350B2

(12) United States Patent
Godman et al.

(10) Patent No.: US 8,238,350 B2
(45) Date of Patent: Aug. 7, 2012

(54) MESSAGE BATCHING WITH CHECKPOINTS SYSTEMS AND METHODS

(75) Inventors: Peter J. Godman, Seattle, WA (US); Skye M. Poier, Princeton (CA); Aaron J. Passey, Seattle, WA (US); Neal T. Fachan, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 1136 days.

(21) Appl. No.: 11/262,314

(22) Filed: Oct. 28, 2005
(Under 37 CFR 1.47)

(65) Prior Publication Data
US 2007/0171919 A1 Jul. 26, 2007

Related U.S. Application Data

(60) Provisional application No. 60/623,848, filed on Oct. 29, 2004, provisional application No. 60/628,528, filed on Nov. 15, 2004.

(51) Int. Cl.
*H04L 12/28* (2006.01)
*G06F 15/16* (2006.01)
(52) U.S. Cl. ........................ 370/396; 709/207
(58) Field of Classification Search ................... 709/207
See application file for complete search history.

(56) References Cited

U.S. PATENT DOCUMENTS

| 4,780,796 A | 10/1988 | Fukuda et al. |
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,423,046 A | 6/1995 | Nunnelley et al. |
| 5,459,871 A | 10/1995 | Van Den Berg |

(Continued)

FOREIGN PATENT DOCUMENTS
EP 0774723 5/1997
(Continued)

OTHER PUBLICATIONS

Nov. 15, 2002 International Search Report PCT/US02/24728.

(Continued)

*Primary Examiner* — John Blanton
(74) *Attorney, Agent, or Firm* — Knobbe, Martens, Olson & Bear LLP

(57) ABSTRACT

Systems and methods are provided for passing control of message dependencies and ordering to one or more network nodes participating in a transaction. Thus, messages can be sent to the participating nodes and the participating nodes can handle the messages according to their respective dependencies without first sending a response or waiting for the next message to arrive. In one embodiment, at least one message is flagged with a checkpoint to indicate that messages sent before the checkpoint are to be handled by the participating nodes before messages after the checkpoint. Messages may also be flagged with error-handling information. For example, a message may be marked to indicate that if the message fails, no further messages are to be sent to the node had the failure. Responses to a group of messages can be collected in a single operation.

12 Claims, 7 Drawing Sheets

U.S. PATENT DOCUMENTS

| | | |
|---|---|---|
| 5,548,724 A | 8/1996 | Akizawa et al. |
| 5,548,795 A | 8/1996 | Au |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown et al. |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,963,963 A | 10/1999 | Schmuck et al. |
| 5,966,707 A | 10/1999 | Van Huben et al. |
| 5,983,232 A | 11/1999 | Zhang |
| 5,996,089 A | 11/1999 | Mann |
| 6,000,007 A | 12/1999 | Leung et al. |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,055,564 A | 4/2000 | Phaal |
| 6,070,172 A | 5/2000 | Lowe |
| 6,081,833 A | 6/2000 | Okamato et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,136,176 A | 10/2000 | Wheeler et al. |
| 6,138,126 A | 10/2000 | Hitz et al. |
| 6,154,854 A | 11/2000 | Stallmo |
| 6,169,972 B1 | 1/2001 | Kono et al. |
| 6,173,374 B1 | 1/2001 | Heil et al. |
| 6,202,085 B1 | 3/2001 | Benson et al. |
| 6,209,059 B1 | 3/2001 | Ofer et al. |
| 6,219,693 B1 | 4/2001 | Napolitano et al. |
| 6,226,377 B1 | 5/2001 | Donaghue, Jr. |
| 6,247,108 B1 | 6/2001 | Long |
| 6,279,007 B1 | 8/2001 | Uppala |
| 6,321,345 B1 | 11/2001 | Mann |
| 6,334,168 B1 | 12/2001 | Islam et al. |
| 6,334,966 B1 | 1/2002 | Hahn et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,415,259 B1 | 7/2002 | Wolfinger et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,496,842 B1 | 12/2002 | Lyness |
| 6,499,091 B1 | 12/2002 | Bergsten |
| 6,502,172 B2 | 12/2002 | Chang |
| 6,502,174 B1 | 12/2002 | Beardsley et al. |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,631,411 B1 | 10/2003 | Welter et al. |
| 6,658,554 B1 | 12/2003 | Moshovos et al. |
| 6,662,184 B1 | 12/2003 | Friedberg |
| 6,668,304 B1 | 12/2003 | Satran et al. |
| 6,671,686 B2 | 12/2003 | Pardon et al. |
| 6,671,704 B1 | 12/2003 | Gondi et al. |
| 6,671,772 B1 | 12/2003 | Cousins |
| 6,687,805 B1 | 2/2004 | Cochran |
| 6,725,392 B1 | 4/2004 | Frey et al. |
| 6,732,125 B1 | 5/2004 | Autrey et al. |
| 6,742,020 B1 | 5/2004 | Dimitroff et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,871,295 B2 | 3/2005 | Ulrich et al. |
| 6,889,231 B1 * | 5/2005 | Souder et al. ............... 707/104.1 |
| 6,895,482 B1 | 5/2005 | Blackmon et al. |
| 6,895,534 B2 | 5/2005 | Wong et al. |
| 6,907,011 B1 | 6/2005 | Miller et al. |
| 6,907,520 B2 | 6/2005 | Parady |
| 6,917,942 B1 | 7/2005 | Burns et al. |
| 6,920,494 B2 | 7/2005 | Heitman et al. |
| 6,922,696 B1 | 7/2005 | Lincoln et al. |
| 6,922,708 B1 | 7/2005 | Sedlar |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,010,622 B1 | 3/2006 | Bauer et al. |
| 7,017,003 B2 | 3/2006 | Murotani et al. |
| 7,043,485 B2 | 5/2006 | Manley et al. |
| 7,043,567 B2 | 5/2006 | Trantham |
| 7,058,639 B1 | 6/2006 | Chatterjee et al. |
| 7,069,320 B1 | 6/2006 | Chang et al. |
| 7,103,597 B2 | 9/2006 | McGoveran |
| 7,111,305 B2 | 9/2006 | Solter et al. |
| 7,113,938 B2 | 9/2006 | Highleyman et al. |
| 7,124,264 B2 | 10/2006 | Yamashita |
| 7,146,524 B2 | 12/2006 | Patel et al. |
| 7,152,182 B2 | 12/2006 | Ji et al. |
| 7,165,192 B1 | 1/2007 | Cadieux et al. |
| 7,177,295 B1 | 2/2007 | Sholander et al. |
| 7,181,746 B2 | 2/2007 | Perycz et al. |
| 7,184,421 B1 | 2/2007 | Liu et al. |
| 7,194,487 B1 | 3/2007 | Kekre et al. |
| 7,206,805 B1 | 4/2007 | McLaughlin, Jr. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,290,056 B1 | 10/2007 | McLaughlin, Jr. |
| 7,313,614 B2 | 12/2007 | Considine et al. |
| 7,318,134 B1 | 1/2008 | Oliveira et al. |
| 7,346,720 B2 | 3/2008 | Fachan |

| | | | |
|---|---|---|---|
| 7,370,064 B2 | 5/2008 | Yousefi'zadeh | |
| 7,373,426 B2 | 5/2008 | Jinmei et al. | |
| 7,386,675 B2 | 6/2008 | Fachan | |
| 7,386,697 B1 | 6/2008 | Case et al. | |
| 7,389,379 B1 | 6/2008 | Goel et al. | |
| 7,440,966 B2 | 10/2008 | Adkins et al. | |
| 7,451,341 B2 | 11/2008 | Okaki et al. | |
| 7,502,801 B2 | 3/2009 | Sawdon et al. | |
| 7,509,448 B2 | 3/2009 | Fachan et al. | |
| 7,509,524 B2 | 3/2009 | Patel et al. | |
| 7,533,298 B2 | 5/2009 | Smith et al. | |
| 7,546,354 B1 | 6/2009 | Fan et al. | |
| 7,546,412 B2 | 6/2009 | Ahmad et al. | |
| 7,551,572 B2 | 6/2009 | Passey et al. | |
| 7,558,910 B2 | 7/2009 | Alverson et al. | |
| 7,571,348 B2 | 8/2009 | Deguchi et al. | |
| 7,577,258 B2 | 8/2009 | Wiseman et al. | |
| 7,577,667 B2 | 8/2009 | Hinshaw et al. | |
| 7,590,652 B2 | 9/2009 | Passey et al. | |
| 7,593,938 B2 | 9/2009 | Lemar et al. | |
| 7,596,713 B2 | 9/2009 | Mani-Meitav et al. | |
| 7,617,289 B2 | 11/2009 | Srinivasan et al. | |
| 7,631,066 B1 | 12/2009 | Schatz et al. | |
| 7,639,818 B2 | 12/2009 | Fujimoto et al. | |
| 7,665,123 B1 | 2/2010 | Szor et al. | |
| 7,676,691 B2 | 3/2010 | Fachan et al. | |
| 7,680,836 B2 | 3/2010 | Anderson et al. | |
| 7,680,842 B2 | 3/2010 | Anderson et al. | |
| 7,685,126 B2 | 3/2010 | Patel et al. | |
| 7,685,162 B2 | 3/2010 | Heider et al. | |
| 7,689,597 B1 | 3/2010 | Bingham et al. | |
| 7,707,193 B2 | 4/2010 | Zayas et al. | |
| 7,716,262 B2 | 5/2010 | Pallapotu | |
| 7,734,603 B1 | 6/2010 | McManis | |
| 7,739,288 B2 | 6/2010 | Lemar et al. | |
| 7,743,033 B2 | 6/2010 | Patel et al. | |
| 7,752,226 B1 | 7/2010 | Harmer et al. | |
| 7,752,402 B2 | 7/2010 | Fachan et al. | |
| 7,756,898 B2 | 7/2010 | Passey et al. | |
| 7,779,048 B2 | 8/2010 | Fachan et al. | |
| 7,783,666 B1 | 8/2010 | Zhuge et al. | |
| 7,788,303 B2 | 8/2010 | Mikesell et al. | |
| 7,797,283 B2 | 9/2010 | Fachan et al. | |
| 7,797,323 B1 | 9/2010 | Eshghi et al. | |
| 7,822,932 B2 | 10/2010 | Fachan et al. | |
| 7,840,536 B1 | 11/2010 | Ahal et al. | |
| 7,844,617 B2 | 11/2010 | Lemar et al. | |
| 7,848,261 B2 | 12/2010 | Fachan | |
| 7,870,345 B2 | 1/2011 | Daud et al. | |
| 7,882,068 B2 | 2/2011 | Schack et al. | |
| 7,882,071 B2 | 2/2011 | Fachan et al. | |
| 7,899,800 B2 | 3/2011 | Fachan et al. | |
| 7,900,015 B2 | 3/2011 | Fachan et al. | |
| 7,917,474 B2 | 3/2011 | Passey et al. | |
| 7,937,421 B2 | 5/2011 | Mikesell et al. | |
| 7,949,636 B2 | 5/2011 | Akidau et al. | |
| 7,949,692 B2 | 5/2011 | Lemar et al. | |
| 7,953,704 B2 | 5/2011 | Anderson et al. | |
| 7,953,709 B2 | 5/2011 | Akidau et al. | |
| 7,962,779 B2 | 6/2011 | Patel et al. | |
| 7,966,289 B2 | 6/2011 | Lu et al. | |
| 7,971,021 B2 | 6/2011 | Daud et al. | |
| 7,984,324 B2 | 7/2011 | Daud et al. | |
| 8,005,865 B2 | 8/2011 | Passey et al. | |
| 8,010,493 B2 | 8/2011 | Anderson et al. | |
| 8,015,156 B2 | 9/2011 | Anderson et al. | |
| 8,015,216 B2 | 9/2011 | Fachan et al. | |
| 8,027,984 B2 | 9/2011 | Passey et al. | |
| 8,051,425 B2 | 11/2011 | Godman et al. | |
| 8,054,765 B2 | 11/2011 | Passey et al. | |
| 8,055,711 B2 | 11/2011 | Fachan et al. | |
| 8,060,521 B2 | 11/2011 | Lemar et al. | |
| 8,082,379 B2 | 12/2011 | Fachan et al. | |
| 8,112,395 B2 | 2/2012 | Patel et al. | |
| 2001/0042224 A1* | 11/2001 | Stanfill et al. | 714/16 |
| 2001/0047451 A1 | 11/2001 | Noble et al. | |
| 2001/0056492 A1 | 12/2001 | Bressoud et al. | |
| 2002/0010696 A1 | 1/2002 | Izumi | |
| 2002/0029200 A1 | 3/2002 | Dulin et al. | |
| 2002/0035668 A1 | 3/2002 | Nakano et al. | |
| 2002/0038436 A1 | 3/2002 | Suzuki | |
| 2002/0049778 A1 | 4/2002 | Bell et al. | |
| 2002/0055940 A1 | 5/2002 | Elkan | |
| 2002/0072974 A1 | 6/2002 | Pugliese et al. | |
| 2002/0075870 A1 | 6/2002 | de Azevedo et al. | |
| 2002/0078161 A1 | 6/2002 | Cheng | |
| 2002/0078180 A1 | 6/2002 | Miyazawa | |
| 2002/0083078 A1 | 6/2002 | Pardon et al. | |
| 2002/0083118 A1 | 6/2002 | Sim | |
| 2002/0087366 A1 | 7/2002 | Collier et al. | |
| 2002/0095438 A1* | 7/2002 | Rising et al. | 707/500.1 |
| 2002/0107877 A1 | 8/2002 | Whiting et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Staub et al. | |
| 2002/0158900 A1 | 10/2002 | Hsieh et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0163889 A1 | 11/2002 | Yemini et al. | |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0170036 A1 | 11/2002 | Cobb et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2002/0198864 A1 | 12/2002 | Ostermann et al. | |
| 2003/0005159 A1 | 1/2003 | Kumhyr | |
| 2003/0009511 A1 | 1/2003 | Giotta et al. | |
| 2003/0014391 A1 | 1/2003 | Evans et al. | |
| 2003/0033308 A1 | 2/2003 | Patel et al. | |
| 2003/0061491 A1 | 3/2003 | Jaskiewicz et al. | |
| 2003/0109253 A1 | 6/2003 | Fenton et al. | |
| 2003/0120863 A1 | 6/2003 | Lee et al. | |
| 2003/0125852 A1 | 7/2003 | Schade et al. | |
| 2003/0126522 A1 | 7/2003 | English et al. | |
| 2003/0135514 A1 | 7/2003 | Patel et al. | |
| 2003/0149750 A1 | 8/2003 | Franzenburg | |
| 2003/0158861 A1 | 8/2003 | Sawdon et al. | |
| 2003/0158873 A1 | 8/2003 | Sawdon et al. | |
| 2003/0161302 A1 | 8/2003 | Zimmermann et al. | |
| 2003/0163726 A1 | 8/2003 | Kidd | |
| 2003/0172149 A1 | 9/2003 | Edsall et al. | |
| 2003/0177308 A1 | 9/2003 | Lewalski-Brechter | |
| 2003/0182312 A1 | 9/2003 | Chen et al. | |
| 2003/0182325 A1 | 9/2003 | Manely et al. | |
| 2003/0233385 A1 | 12/2003 | Srinivasa et al. | |
| 2003/0237019 A1 | 12/2003 | Kleiman et al. | |
| 2004/0003053 A1 | 1/2004 | Williams | |
| 2004/0024731 A1 | 2/2004 | Cabrera et al. | |
| 2004/0024963 A1 | 2/2004 | Talagala et al. | |
| 2004/0078680 A1 | 4/2004 | Hu et al. | |
| 2004/0078812 A1* | 4/2004 | Calvert | 725/46 |
| 2004/0117802 A1 | 6/2004 | Green | |
| 2004/0133670 A1 | 7/2004 | Kaminksky et al. | |
| 2004/0143647 A1 | 7/2004 | Cherkasova | |
| 2004/0153479 A1 | 8/2004 | Mikesell et al. | |
| 2004/0158549 A1 | 8/2004 | Matena et al. | |
| 2004/0174798 A1 | 9/2004 | Riguidel et al. | |
| 2004/0189682 A1 | 9/2004 | Troyansky et al. | |
| 2004/0199734 A1 | 10/2004 | Rajamani et al. | |
| 2004/0199812 A1 | 10/2004 | Earl et al. | |
| 2004/0205141 A1* | 10/2004 | Goland | 709/206 |
| 2004/0230748 A1 | 11/2004 | Ohba | |
| 2004/0240444 A1 | 12/2004 | Matthews et al. | |
| 2004/0260673 A1 | 12/2004 | Hitz et al. | |
| 2004/0267747 A1 | 12/2004 | Choi et al. | |
| 2005/0010592 A1 | 1/2005 | Guthrie | |
| 2005/0033778 A1 | 2/2005 | Price | |

| | | | |
|---|---|---|---|
| 2005/0044197 A1 | 2/2005 | Lai | |
| 2005/0066095 A1 | 3/2005 | Mullick et al. | |
| 2005/0114402 A1 | 5/2005 | Guthrie | |
| 2005/0114609 A1 | 5/2005 | Shorb | |
| 2005/0125456 A1 | 6/2005 | Hara et al. | |
| 2005/0131860 A1 | 6/2005 | Livshits | |
| 2005/0131990 A1 | 6/2005 | Jewell | |
| 2005/0138195 A1 | 6/2005 | Bono | |
| 2005/0138252 A1 | 6/2005 | Gwilt | |
| 2005/0171960 A1 | 8/2005 | Lomet | |
| 2005/0171962 A1 | 8/2005 | Martin et al. | |
| 2005/0187889 A1 | 8/2005 | Yasoshima | |
| 2005/0188052 A1 | 8/2005 | Ewanchuk et al. | |
| 2005/0192993 A1 | 9/2005 | Messinger | |
| 2005/0193389 A1 | 9/2005 | Murphy et al. | |
| 2005/0289169 A1 | 12/2005 | Adya et al. | |
| 2005/0289188 A1 | 12/2005 | Nettleton et al. | |
| 2006/0004760 A1 | 1/2006 | Clift et al. | |
| 2006/0041894 A1* | 2/2006 | Cheng et al. | 719/326 |
| 2006/0047713 A1 | 3/2006 | Gornshtein et al. | |
| 2006/0047925 A1* | 3/2006 | Perry | 711/162 |
| 2006/0053263 A1 | 3/2006 | Prahlad et al. | |
| 2006/0059467 A1 | 3/2006 | Wong | |
| 2006/0074922 A1 | 4/2006 | Nishimura | |
| 2006/0083177 A1 | 4/2006 | Iyer et al. | |
| 2006/0095438 A1 | 5/2006 | Fachan et al. | |
| 2006/0101062 A1 | 5/2006 | Godman et al. | |
| 2006/0129584 A1 | 6/2006 | Hoang et al. | |
| 2006/0129631 A1* | 6/2006 | Na et al. | 709/203 |
| 2006/0129983 A1 | 6/2006 | Feng | |
| 2006/0155831 A1 | 7/2006 | Chandrasekaran | |
| 2006/0206536 A1 | 9/2006 | Sawdon et al. | |
| 2006/0230411 A1 | 10/2006 | Richter et al. | |
| 2006/0277432 A1 | 12/2006 | Patel | |
| 2006/0288161 A1 | 12/2006 | Cavallo | |
| 2006/0294589 A1 | 12/2006 | Achanta et al. | |
| 2007/0038887 A1 | 2/2007 | Witte et al. | |
| 2007/0091790 A1 | 4/2007 | Passey et al. | |
| 2007/0094269 A1 | 4/2007 | Mikesell et al. | |
| 2007/0094277 A1 | 4/2007 | Fachan et al. | |
| 2007/0094310 A1 | 4/2007 | Passey et al. | |
| 2007/0094431 A1 | 4/2007 | Fachan | |
| 2007/0094449 A1 | 4/2007 | Allison et al. | |
| 2007/0094452 A1 | 4/2007 | Fachan | |
| 2007/0124337 A1 | 5/2007 | Flam | |
| 2007/0168351 A1 | 7/2007 | Fachan | |
| 2007/0192254 A1 | 8/2007 | Hinkle | |
| 2007/0195810 A1 | 8/2007 | Fachan | |
| 2007/0198518 A1 | 8/2007 | Luchangco et al. | |
| 2007/0233684 A1 | 10/2007 | Verma et al. | |
| 2007/0233710 A1 | 10/2007 | Passey et al. | |
| 2007/0244877 A1 | 10/2007 | Kempka | |
| 2007/0255765 A1 | 11/2007 | Robinson | |
| 2007/0255921 A1 | 11/2007 | Gole et al. | |
| 2007/0288490 A1 | 12/2007 | Longshaw | |
| 2008/0005145 A1 | 1/2008 | Worrall | |
| 2008/0010507 A1 | 1/2008 | Vingralek | |
| 2008/0021907 A1 | 1/2008 | Patel et al. | |
| 2008/0031238 A1 | 2/2008 | Harmelin et al. | |
| 2008/0034004 A1 | 2/2008 | Cisler et al. | |
| 2008/0044016 A1 | 2/2008 | Henzinger | |
| 2008/0046432 A1 | 2/2008 | Anderson et al. | |
| 2008/0046443 A1 | 2/2008 | Fachan et al. | |
| 2008/0046444 A1 | 2/2008 | Fachan et al. | |
| 2008/0046445 A1 | 2/2008 | Passey et al. | |
| 2008/0046475 A1 | 2/2008 | Anderson et al. | |
| 2008/0046476 A1 | 2/2008 | Anderson et al. | |
| 2008/0046667 A1 | 2/2008 | Fachan et al. | |
| 2008/0059541 A1 | 3/2008 | Fachan et al. | |
| 2008/0059734 A1 | 3/2008 | Mizuno | |
| 2008/0126365 A1 | 5/2008 | Fachan et al. | |
| 2008/0151724 A1 | 6/2008 | Anderson et al. | |
| 2008/0154978 A1 | 6/2008 | Lemar et al. | |
| 2008/0155191 A1 | 6/2008 | Anderson et al. | |
| 2008/0168209 A1 | 7/2008 | Davison | |
| 2008/0168304 A1 | 7/2008 | Flynn et al. | |
| 2008/0168458 A1 | 7/2008 | Fachan et al. | |
| 2008/0243773 A1 | 10/2008 | Patel et al. | |
| 2008/0256103 A1 | 10/2008 | Fachan et al. | |
| 2008/0256545 A1 | 10/2008 | Fachan et al. | |
| 2008/0263549 A1 | 10/2008 | Walker | |
| 2008/0294611 A1 | 11/2008 | Anglin et al. | |
| 2009/0125563 A1 | 5/2009 | Wong et al. | |
| 2009/0248975 A1 | 10/2009 | Daud et al. | |
| 2010/0122057 A1 | 5/2010 | Strumpen et al. | |
| 2010/0185592 A1 | 7/2010 | Kryger | |
| 2010/0223235 A1 | 9/2010 | Fachan | |
| 2010/0306786 A1 | 12/2010 | Passey | |
| 2011/0016353 A1 | 1/2011 | Mikesell et al. | |
| 2011/0022790 A1 | 1/2011 | Fachan | |
| 2011/0035412 A1 | 2/2011 | Fachan | |
| 2011/0044209 A1 | 2/2011 | Fachan | |
| 2011/0087635 A1 | 4/2011 | Fachan | |
| 2011/0113211 A1 | 5/2011 | Fachan et al. | |
| 2011/0119234 A1 | 5/2011 | Schack et al. | |
| 2011/0145195 A1 | 6/2011 | Passey et al. | |
| 2011/0153569 A1 | 6/2011 | Fachan et al. | |

FOREIGN PATENT DOCUMENTS

| | | |
|---|---|---|
| EP | 1421520 | 5/2004 |
| EP | 1563411 | 8/2005 |
| EP | 2284735 | 2/2011 |
| EP | 2299375 | 3/2011 |
| JP | 04096841 | 3/1992 |
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

Apr. 20, 2004 International Search Report PCT/US03/36699.
Aug. 6, 2004 International Search Report PCT/US03/33704.
Steven M. Bauer, Letter to Steve Goldman, Jul. 31, 2006 (including the first pages of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (including exhibits listed separately), 1 page.
Isilon Systems, "Isilon IQ Platform Overview", 4 pages (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
Feb. 22, 2008 International Search Report PCT/US07/018326, 20 pages.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Haerder T et al: "Principles of Transaction-Oriented Database Recovery" ACM Computing Surveys, ACM, New York, NY, US, vol. 15, No. 4, Dec. 1, 1983, pp. 287-317.

Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Levy E Ed—Institute of Electrical and Electronics Engineers: "Incremental restart (database management)" Proceedings of the International Conference on Data Engineering. Kobe, JP, Apr. 8-12, 1991; [Proceedings of the International Conference on Data Engineering], Los Alamitos, IEEE Comp. Soc. Press, U.S., vol. Conf. 7, Apr. 8, 1991, pp. 640-648.
May 8, 2008 Int'l Search report PCT/US07/018324, 13 pages.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1—p. 447, last line.
Tanenbaum, Andrew S., Minix Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. '94, No. 80, p. 9-16.
May 18, 2009 Int'l Search report PCT/US08/059798, 18 pages.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.
Oct. 8, 2008 European Supplemental Search Report EP 02 75 6944, 6 pages.
Jan. 23, 2009 Examination Report EP 02 75 6944, 5 pages.
Oct. 22, 2009 Int'l Preliminary Report on Patentability PCT/US08/059798, 10 pages.
Keidar, et al.: Increasing the Resilience of Distributed and Replicated Database Systems (1998) pp. 1-25.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.
Yoshitake Shinkai, Cluster File System: Hamfs, Fujitsu, Japan, Fujitsu Limited, Jul. 9, 1999, vol. 50, No. 4, pp. 210 to 214 (stamped Citation 2 / English Translation attached) total 16 pages.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-620.
Coulouris et al., *Distributed Systems Concepts and Design*, Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.

Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996, pp. 410-871.
Sape Mullender, editor, *Distributed Systems* ($2^{nd}$ Ed.), ACM Press/Addison-Wesley Publishing Co., New York, NY, USA, 1993, pp. 1-327.
Sape Mullender, editor, *Distributed Systems* ($2^{nd}$ Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System*, Symposium on Operating Systems PrinciplesOct. 19-22, 2003, 15 pages, Bolton Landing, NY.
Pei Cao et al., *The TickerTAIP parallel RAID architecture*, 1993, 12 pages, Princeton, NJ.
Pei Cao et al., *The TickerTAIP parallel RAID architecture*; ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, 1994, pp. 1-148, University of California at Berkeley.
Darrell D.E. Long et al., *Swift/RAID: A Distributed RAID System*, Computing Systems, vol. 7, No. 3 Summer 1994, pp. 333-359.
Michael Stonebraker et al., *Distributed Raid: A new Multiple copy Algorithm*, IEEE 1990, pp. 430-437, Berkeley, California.
United States Court of Appeals, Federal Circuit, *Seachange International, Inc.* Vs. *nCUBE, Corp.*, Oct. 26, 2004, 28 pages.
United States Court of Appeals, Federal Circuit, *Seachange International, Inc.* Vs. *C-Cor, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.
European Search Report dated May 21, 2007 issued to EP application No. 02756944.1-2201.
Stallings, William, "Operating Systems," Prentice Hall, Fourth Edition, 2001, pp. 197-253 and 265-293.
Jan. 2, 2012 Extended European Search Report EP 2299375, 6 pages.
Duchamp, Dan: "Analysis of Transaction Management Performance", ACM Symposium on Operating Systems Principles, Dec. 1989, pp. 177-190.
Silaghi, Raul et al.: "Porting OMTTs to COBRA", Lecture Notes in Computer Science, vol. 2888/2003, Nov. 2003, pp. 1521-1542.
Dorai et al.:, "Transport Threads: Resource Sharing in SMT Processor for High Single-Thread Performance", proceedings of the 2002 International Conference on Parallel Architectures and Complication Techniques, Sep. 2002, 12 pages.
Peterson, Zachary Nathaniel Joseph, "Data Placement for Copy-On-Write Using Virtual Contiguity," Master of Science in Computer Science Thesis, University of California, Santa Cruz, Sep. 2002, 67 pages.
HP, Slow Internal Disk, Feb. 22, 2005, p. 2 and 6, in 7 pages.
Shen, et al., Distributed and Dynamic Task Reallocation in Robot Organizations; IEEE 2002, pp. 1019-1024.

* cited by examiner

MESSAGE BATCHING WITH CHECKPOINTS SYSTEMS AND METHODS

REFERENCE TO RELATED APPLICATIONS

The present application claims priority benefit under 35 U.S.C. §119(e) from U.S. Provisional Application No. 60/623,848, filed Oct. 29, 2004 entitled "Message Batching with Checkpoints Systems and Methods," and U.S. Provisional Application No. 60/628,528, filed Nov. 15, 2004 entitled "Message Batching with Checkpoints Systems and Methods." The present application also hereby incorporates by reference herein both of the foregoing applications in their entirety.

The present application relates to U.S. application Ser. No. 11/262,306, titled "Non-Blocking Commit Protocol Systems and Methods," filed on Oct. 28, 2005, which claims priority to U.S. Provisional Application No. 60/623,843, filed Oct. 29, 2004 entitled "Non-Blocking Commit Protocol Systems and Methods;" and U.S. application Ser. No. 11/262,308, titled "Distributed System with Asynchronous Execution Systems and Methods," filed on Oct. 28, 2005, which claims priority to U.S. Provisional Application No. 60/623,846, filed Oct. 29, 2004 entitled "Distributed System with Asynchronous Execution Systems and Methods," and U.S. Provisional Application No. 60/628,527, filed Nov. 15, 2004 entitled "Distributed System with Asynchronous Execution Systems and Methods." The present application hereby incorporates by reference herein all of the foregoing applications in their entirety.

BACKGROUND

1. Field of the Invention

This invention relates to systems and methods for sending messages between two or more nodes in a network.

2. Description of the Related Art

A node is a start point, end point or redistribution point of data transmitted through a network. Typically, a node is configured to recognize, process and forward messages to other nodes in the network. For example, a local node can send a remote procedure call (RPC) to one or more remote nodes to request a service or information from a program located in the remote nodes. Some messages are sent one-way from a sending node to one or more receiving nodes. Other messages expect one or more of the receiving nodes to return a response to the sending node. The response may be an indication, for example, that the message was received or executed successfully. Generally, messages are sent over the network between nodes using a reliable protocol such as TCP or the like.

Some operations comprise multiple messages that are sent between two or more nodes in a network. For example, an operation for writing data to a distributed file system may comprise messages to allocate space for the data blocks, messages to set the size of the file and data blocks, messages to set block addresses, messages to update metadata for the file, messages to execute a commit protocol, and the like. The selection and order of the messages are controlled to successfully carry out the desired network operation. Generally, a sending node can send a series of messages synchronously or asynchronously. In synchronous operation, the sending node typically sends a message to and waits for a response from one or more of the receiving nodes. In asynchronous operation, processes or threads that share the same address space allow multiple messages to be sent by the sending node and processed by one or more receiving nodes concurrently.

SUMMARY

It would be advantageous to develop a technique and system for passing control of message dependencies and ordering to participant nodes. In one embodiment, checkpoints are set in the batch to define dependencies among messages. Some messages may also be marked with error-handling information that can be used by both the initiator node and the participant nodes. The initiator node sends fewer collect messages and less time is spent waiting for responses; thus the transaction's messages are executed more quickly.

According to the foregoing, in one embodiment, a distributed system is provided. The distributed system may include a first storage unit; a second storage unit in communication with the first storage unit; wherein the first storage unit is configured to send a first message and a second message to the second storage unit; wherein the second message includes a checkpoint flag; and wherein the second storage unit is configured to selectively execute the first message and the second message in parallel based at least in part on whether the checkpoint flag is set, wherein, if the checkpoint flag is set, the second storage unit executes the first message to completion before executing the second message.

In another embodiment, a method is provided for coordinating transactions performed by participating nodes in a network. The method may include sending a plurality of messages from a first node to a second node, wherein at least one message comprises message dependency data; executing at least a portion of the plurality of messages on the second node, wherein the second node determines when to execute the plurality of messages based at least in part on the message dependency data; and synchronizing the first node with the second node.

In an additional embodiment, a method is provided for sending messages between nodes in a communication medium. The method may include transmitting a plurality of messages to one or more nodes, wherein at least one of the messages comprises message ordering information; and handling the messages in an order based at least in part on the message ordering information.

In a further embodiment, a message initiation system is provided. The message initiation system may be configured to transmit a first message to a remote system; and transmit a second message to the remote system, wherein the second message includes a first flag that indicates that the first message should execute before the second message.

In an additional embodiment, a message participant system is provided. The message participant system may be configured to receive a first message from a message initiation system; receive a second message from the message initiation system, wherein the second message includes a first flag that indicates that the first message should execute before the second message; execute the first message; and after the first message has completed execution, execute the second message.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF PREFERRED EMBODIMENTS

A program can be configured to batch multiple messages of a network operation. Batching is used to group multiple messages together into a collection that may be operated on as a whole. For example, an API may be configured to wait on all responses of a group of messages or to return a coalesced result code for a group of messages. Thus, responses from multiple asynchronous messages from one or more receiving nodes can be collected at the end of the batch and synchronized with the sending node. As used herein, an "initiator" is a node that starts, ends, sends messages and collects responses to the messages in the batch. A "participant" is a node that receives and executes messages in the batch. An artisan will recognize that an initiator can also be a participant.

Figure 1A:
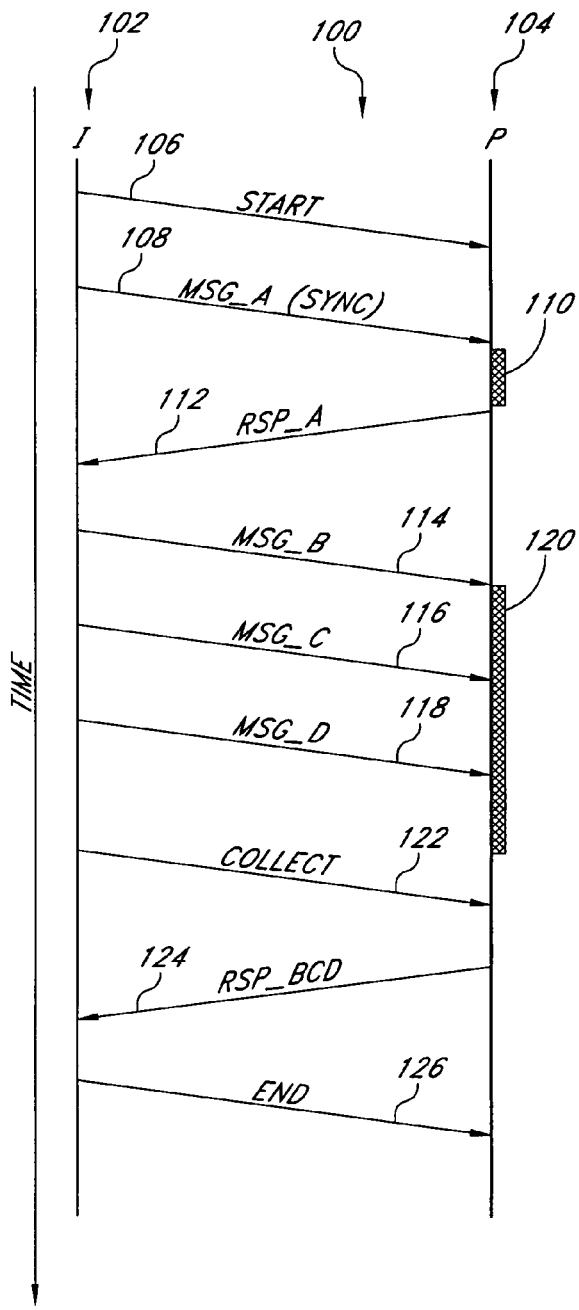
FIG. 1A is a timing chart of a transaction between an initiator node and a participant node.

FIG. 1A illustrates a timing chart of a transaction 100 comprising batching of a plurality of messages sent between an initiator 102 (shown as "I") and a participant 104 (shown as "P"). The initiator 102 begins the transaction 100 by sending a START message 106 to the participant 104. In this example, the START message 106 is a one-way message. Therefore, the initiator 102 does not expect a response and the participant 104 does not send a response. The initiator 102 may also send, for example, a synchronous message 108 (shown as "MSG_A") to the participant 104. The participant 104 processes the synchronous message 108 for a period of time 110, after which it returns a response 112 (shown as "RSP_A") corresponding to a result of processing the synchronous message 108.

The initiator 102 may also send multiple asynchronous messages 114, 116, 118 (shown as "MSG_B," "MSG_C" and "MSG_D," respectively) to the participant 104. The participant 104 executes the asynchronous messages 114, 116, 118 in parallel during a time period 120. Then, the initiator 102 sends a COLLECT message 122 to the participant 104. In other embodiments, the initiator 102 expects the time period 120 to have ended after a certain time and then after such time, the initiator 102 sends a COLLECT message 122 to the participant 104. Upon receiving the COLLECT message 122, the participant returns a response 124 (shown as "RSP_BCD") corresponding to results of processing the asynchronous messages 114, 116, 118. The initiator 102 then sends an END message 126 to the participant 104.

While batching in the example shown in FIG. 1A allows responses to the asynchronous messages 114, 116, 118 to be grouped into the response 124, ordering and dependencies among the asynchronous messages 114, 116, 118 cannot be achieved without substantially increasing the amount of time required to complete the transaction 100.

For example, suppose execution of the third asynchronous message 118 blocks continued execution of the transaction 100 unless the participant 104 successfully executes the first and second asynchronous messages 114, 116 sent by the initiator 102. To prevent such blocking, the first and second asynchronous messages 114, 116, could be changed to synchronous messages that would each return an individual response (not shown). The initiator could then send the third asynchronous message 118 after receiving each of the individual responses. However, this would add additional time to the transaction 100 since the synchronous messages 114, 116 would not run in parallel and would require extra time for the responses to be communicated from the participant 104 to the initiator 102.

Figure 1B:
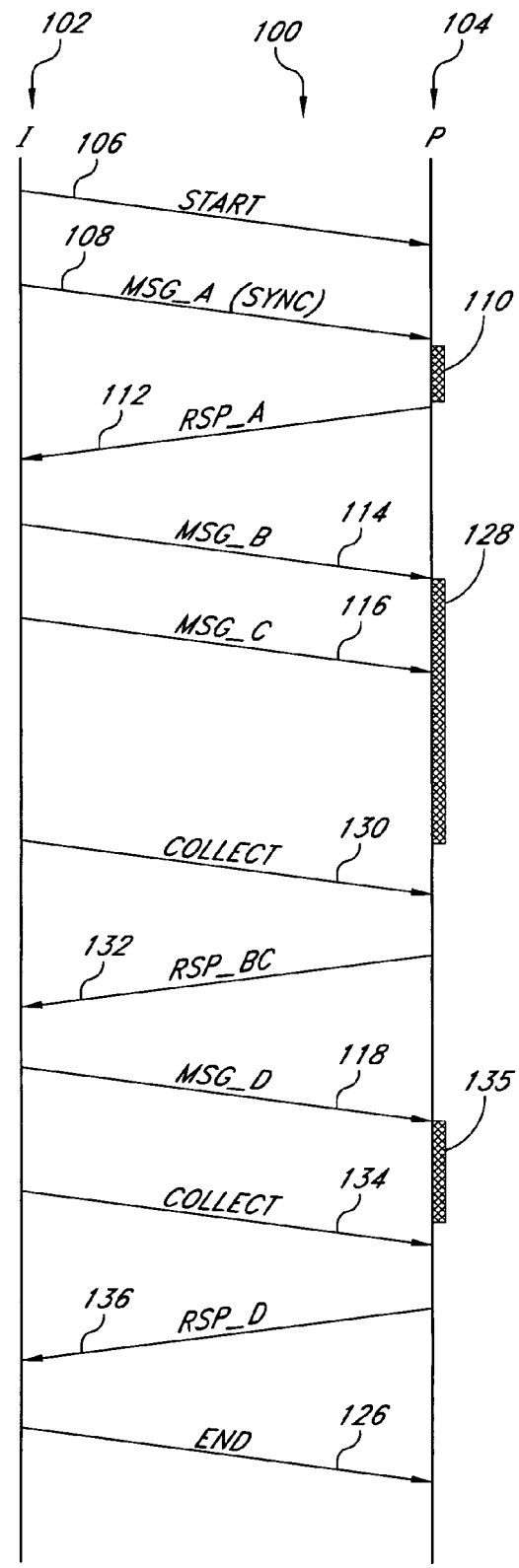
FIG. 1B is a timing chart of a transaction between an initiator node and a participant node involving a message dependency.

In another example shown in FIG. 1B, the initiator 102 can also avoid the blocking discussed above by sending the asynchronous messages 114, 116 to the participant 104 so they can be executed in parallel during a time period 128. The initiator 102 can then send a first COLLECT message 130 and receive a response 132 (shown as "RSP_BC") corresponding the results of processing the asynchronous messages 114, 116. Following the response 132, the initiator 102 may send the asynchronous message 118 for the participant 104 to execute during a time period 135. Then, the initiator 102 can send a second COLLECT message 134 and receive a response 136 (shown as "RSP_D") corresponding to the result of processing the asynchronous message 118. However, the added round trip of the additional COLLECT message 130 and the corresponding response 132 adds a substantial amount of time to the transaction 100.

In one embodiment of the invention, a participant node passes control of message dependencies and ordering to one or more participant nodes in a transaction. In this way, messages can be sent in parallel to the participant nodes and the participant nodes can execute the messages according to their respective dependencies without first sending a response and waiting for the next message to arrive.

In one embodiment, the participant nodes control message dependencies and ordering by receiving messages that are flagged with checkpoints in the batch to indicate that messages received before the checkpoint are to be executed before messages received after the checkpoint. In one embodiment, messages can also include error-handling information. For example, a message can be marked as "critical" such that if the message fails on a particular participating node, the initiator node does not send any more messages to that node until the critical error is cleared. Further, the participant node that had the critical failure discards any messages that have not yet been executed.

When the initiator node wants to know the result of marked messages or wait until sent messages have been processed by the participant nodes, the initiator node can send a collect message to the participant nodes. Sending a collect message and receiving a response to the collect message guarantees all messages in the batch have been executed and responded to (if the message has a response), or discarded if a critical error was set. In one embodiment, collecting also clears the critical error condition.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known components and methods have not been described in detail so as not to unnecessarily obscure aspects of the present invention.

I. System

Figure 2:
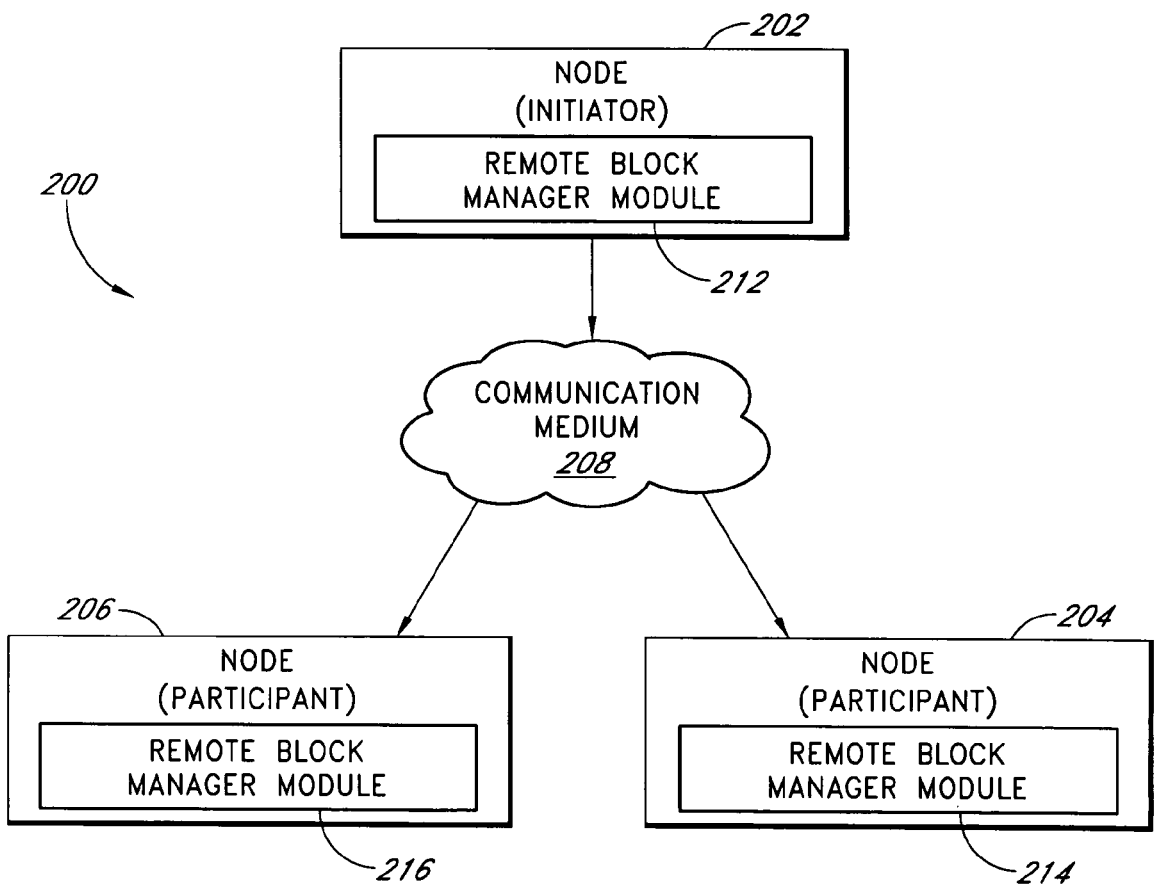
FIG. 2 is an exemplary block diagram of a network and its nodes according to one embodiment of the invention.

FIG. 2 is an exemplary block diagram of a network 200 according to one embodiment of the invention. The network 200 comprises a plurality of nodes 202, 204, 206 configured to communicate with each other through a communication medium 208. The communication medium 208 comprises, for example, the Internet or other global network, an intranet, a wide area network (WAN), a local area network (LAN), a high-speed network medium such as Infiniband, dedicated communication lines, telephone networks, wireless data transmission systems, two-way cable systems or customized computer interconnections including computers and network devices such as servers, routers, switches, memory storage units, or the like.

The nodes 202, 204, 206 respectively comprise remote block manager modules 212, 214, 216. As used herein, the word module is a broad term that has its ordinary and customary meaning and also refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

The remote block manager modules 212, 214, 216 are configured to control communication between the nodes 202, 204, 206 including, for example, transmitting messages, receiving messages, redistributing messages, executing received messages, providing responses to messages, combinations of the forgoing, or the like. In one embodiment, the remote block manager modules 212, 214, 216 are configured to communicate, RPC messages between nodes 202, 204, 206 over the communication medium 208 using TCP. An artisan will recognize from the disclosure herein, however, that other message or transmission protocols can be used.

In one embodiment, at least one of the nodes 202, 204, 206 comprises a storage unit in a distributed file system as described in U.S. patent application Ser. No. 10/007,003, filed Nov. 9, 2001, which is herein incorporated by reference. In addition, or in other embodiments, at least one of the nodes 202, 204, 206 may comprise a conventional computer or any device capable of communicating with the network 200 including, for example, a computer workstation, a LAN, a kiosk, a point-of-sale device, a personal digital assistant, an interactive wireless communication device, an interactive television, a transponder, or the like.

In a transaction among the nodes 202, 204, 206, one of the nodes 202, 204, 206 is configured to act as an initiator and one or more of the nodes 202, 204, 206 are configured to act as participants. In some embodiments, any of the nodes 202, 204, 206 may be selected to act as the initiator. In other embodiments, the initiator may be selected based at least in part on a service provided by at least one participant node requested by the initiator in the transaction. In some embodiments, an initiator may also be a participant in a particular transaction. An artisan will recognize from the disclosure herein that the network 200 is not limited to the three nodes 202, 204, 206 shown in FIG. 2 and may comprise any number of nodes including, for example, one node, two nodes, or greater than three nodes. Further, any number of nodes may be configured as participants in a particular transaction including, for example, only one participant. In the exemplary embodiment shown in FIG. 2, the node 202 is configured as an initiator (hereinafter, the "initiator node 202") and the nodes 204, 206 are configured as participants (hereinafter, the "participant nodes 204, 206").

A. Remote Block Manager in Initiator Mode

The remote block manager module 212 of the initiator node 202 is configured to group messages together into a batch that may be operated on as a whole. As discussed in more detail below, the remote block manager module 212 of the initiator node 202 is configured to start a batch, end the batch, send messages in the batch, and collect any responses to the messages.

1. Checkpoints

The remote block manager module 212 is also configured to set one or more checkpoints in the batch in order to pass control of message dependencies and ordering to the participant nodes 204, 206. For example, the initiator node 202 can set a checkpoint between asynchronous messages sent in parallel to the participant nodes 204, 206 to signal that messages sent before the checkpoint are to be executed before messages sent after the checkpoint. Thus, delay in the overall transaction can be reduced because the initiator node 202 does not have to collect responses before sending messages that depend on the execution of prior messages. In one example, a required input of message X in a batch could be an output of a previous message; such that message X depends upon the previous message.

Separate checkpoint messages can be sent to the participant nodes 204, 206. In a preferred embodiment, however, the initiator node 202 does not send separate checkpoint messages. Rather, the remote block manager module 212 is configured to flag the next message in the batch to be sent to the participant nodes 204, 206 to indicate that a checkpoint precedes its handling. Thus, avoiding the time required to transmit a separate checkpoint message across the communication medium 208 reduces the delay in the overall transaction. Further, multiple checkpoints set by the remote block manager module 212 without an intervening message can be treated as a single checkpoint without a performance penalty that may be caused by a separate checkpoint message being sent across the network 200 to the participant nodes 204, 206.

In some embodiments, a checkpoint can be set on messages sent to a portion of the participant nodes 204, 206. For example, the remote block manager module 212 may be configured to set a particular checkpoint on a message sent to the participant node 204 without setting the checkpoint on the message sent to the participant node 206.

2. Marking Messages

In one embodiment, the remote block manager module 212 of the initiator node 202 is also configured to handle message failures by marking one or more messages in the batch as "critical." If a critical message fails on one or more of the participant nodes 204 (for example, the remote block manager module 212 receives a "failure message" from one or more of the participant nodes), 206, the remote block manager module 212 is configured to stop sending messages to the node that had the failure. In some embodiments, the remote block manager module 212 may continue to send non-critical messages to the node that had the failure while not sending critical messages.

The remote block manager 212 may also be configured to mark certain messages to ignore a critical failure. For example, a message may be flagged to be sent to the participant node 204 even if a critical failure has already been reported on that node 204. As another example, a message may be flagged to be run on the participant node 204 even after a critical failure has occurred. In one embodiment, the remote block manager 212 may mark messages by sending a particular code in the message, though other marking techniques may be used.

3. Collecting Responses

The remote block manager module 212 of the initiator node 202 is also configured to synchronize with the participant nodes 204, 206 by collecting any responses to messages previously sent in the batch. Thus, the batch can be collected to verify the result of critical messages in the batch or wait until all messages have been processed by the participant nodes. In one embodiment, the remote block manager module 212 is configured to collect the batch by sending collect messages to the participant nodes 204, 206. In addition, or in other embodiments, collecting the batch clears any critical error condition that may exist on the initiator node so the batch can be used for any failure cleanup functions or cancellation messages.

B. Remote Block Manager in Participant Mode

The remote block manager modules 214, 216 of the respective participant nodes 204, 206 are configured to receive and execute messages in the batch and to send responses to the initiator node 202. The remote block manager modules 214, 216 are configured to execute one or more received messages in parallel and to start executing the messages in the order the messages were sent from the initiator node 202. However, if a message is flagged with a checkpoint, the remote block manager modules 214, 216 will not execute the message or any subsequent messages until the messages sent up to the checkpoint have been executed to completion. Thus, the remote block manager modules 214, 216 in the participant nodes 204, 206 can handle message dependencies without sending responses to the initiator node 202 and then waiting for the dependent message to be received.

As discussed above, the remote block manager modules 214, 216 of the respective participant nodes 204, 206 may receive one or more messages marked as critical. If a critical message fails during execution, messages that have not yet been processed will be discarded on the node that had the failure. In one embodiment, messages already being processed when the critical failure occurs will continue to run to completion. However, new messages or messages received but not yet executed will be discarded by the node that had the critical failure. As also discussed above, the remote block manager modules 214, 216 may be configured to execute certain flagged messages even after a critical failure has occurred. In some embodiments, after a critical failure has occurred, the remote block manager module 212 may send a "failure message" to the initiator node 202. Furthermore, in some embodiments, the remote block manager module 212 sends a status message for each message marked critical.

Upon receiving a collect message from the initiator node 202, each of the remote block manager modules 214, 216 of the respective participant nodes 204, 206 are configured to return a response comprising the results of one or more messages received since a previous collect message, if any, was received. The results may include, for example, indication that a critical failure has occurred during the execution of a message.

If a critical failure has occurred on a node, the respective remote block manager module 214, 216 will not return a response to the collect message until queued messages on or in-transit to the node are discarded and currently executing messages have run to completion. For a node that did not have a critical failure, the respective remote block manager module 214, 216 will not return a response to the collect message until queued messages on, in-transit to, or already running have been executed to completion. In addition, or in other embodiments, the remote block manager modules 214, 216 are configured to clear any critical error condition that may exist on its respective participant node 204, 206.

II. Exemplary Timing Diagram

Figure 3:
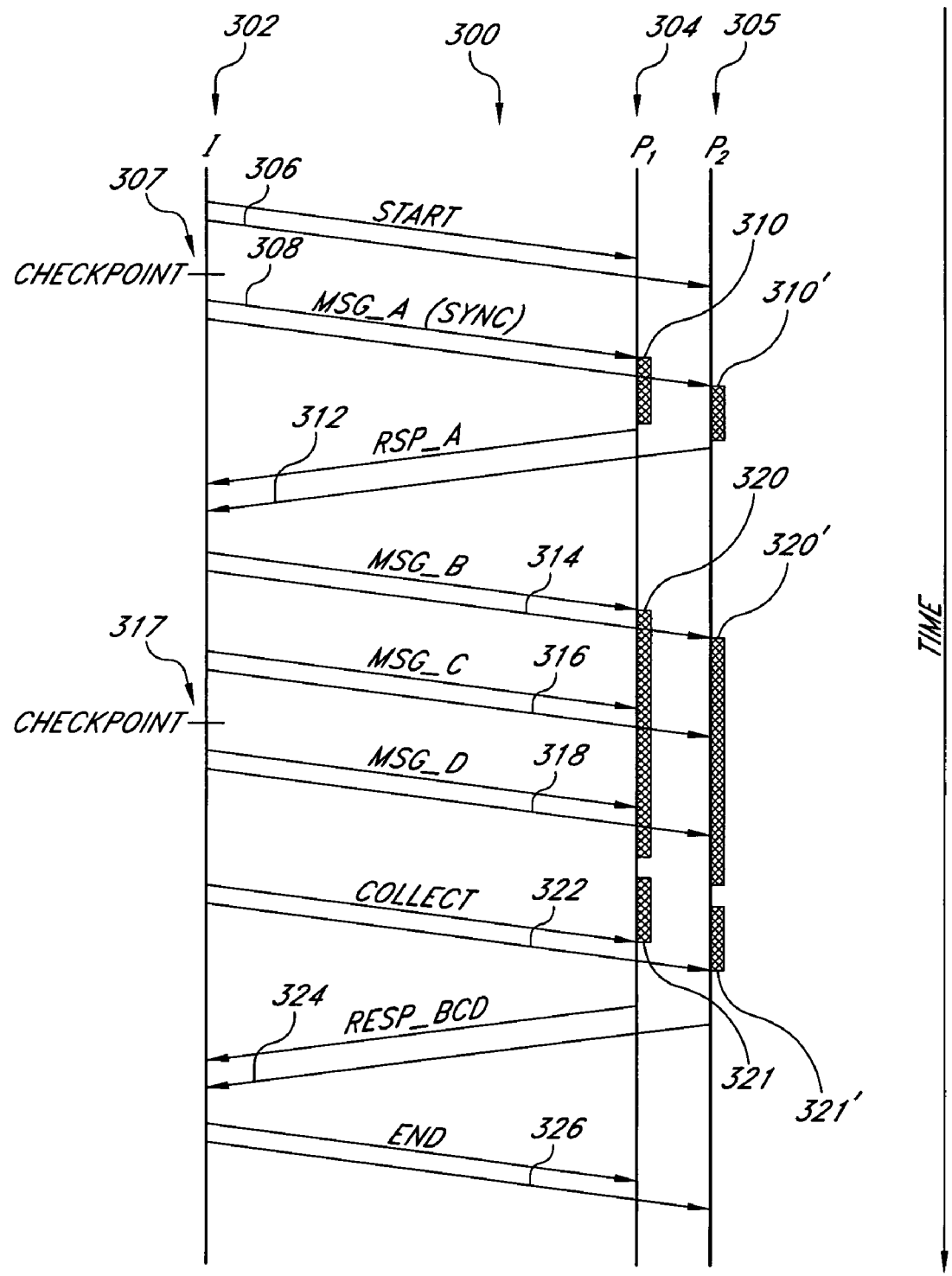
FIG. 3 is an exemplary timing diagram of a transaction between an initiator node, a first participant node and a second participant node according to one embodiment of the invention.

FIG. 3 illustrates an exemplary timing diagram of a transaction 300 comprising batching of a plurality of messages sent between an initiator 302 (shown as "I"), a first participant 304 (shown as "$P_1$") and a second participant 305 (shown as "$P_2$") according to an embodiment of the invention. An artisan will recognize from the disclosure herein that two participants 304, 305 are shown for illustrative purposes and that any number of participants could be involved in the transaction 300.

The initiator 302 begins the transaction 300 by sending START messages 306 to the participants 304, 305. The exemplary START messages 306 are one way messages and do not have responses. The initiator 302 also sends a synchronous message 308 (shown as "MSG_A") to the participants 304, 305. In this example, the batch includes a first checkpoint 307 between the sending of the START message 306 and the synchronous message 308. Thus, the synchronous message 308 includes a flag to indicate the occurrence of the first checkpoint 307 in the batch. Therefore, the participants 304, 305 do not execute the synchronous message 308 until the START message 306 executes to completion.

The participants 304, 305 process the synchronous messages 308 for respective periods of time 310, 310', after which they return responses 312 (shown as "RSP_A") corresponding to respective results of processing the synchronous message 308. After receiving the responses 312, the initiator 302 sends first asynchronous messages 314 (shown as "MSG_B"), second asynchronous messages 316 (shown as "MSG_C") and third asynchronous messages 318 (shown as "MSG_D") to the participants 304, 305. An artisan will recognize that the periods of time 310, 310' or other time periods depicted in transaction 300 can be of arbitrary length and may be of differing lengths, possibly resulting in responses 312 or other responses being returned in an arbitrary order.

In this example, the batch includes a second checkpoint 317 between the second asynchronous messages 316 and the third asynchronous messages 318. Thus, the third asynchronous messages 318 include a flag to indicate the occurrence of the second checkpoint 317 in the batch. Therefore, the participants 304, 305 each execute the first asynchronous messages 314 and the second asynchronous messages 316 in parallel during respective time periods 320, 320'. After the first asynchronous messages 314 and the second asynchronous messages 316 execute to completion, the participants 304, 305 each execute the third asynchronous message 318 during respective time periods 321, 321'.

The initiator 302 then sends COLLECT messages 322 to the participants 304, 304. In some embodiments, the initiator 302 waits an expected elapsed time corresponding, for example, to the time periods 320, 320', 321, 321' before sending the COLLECT messages 322 to the participants 304, 305. Upon receiving the COLLECT messages 322, the participants 304, 305 return respective responses 324 (shown as "RESP_BCD") corresponding to results of processing the asynchronous messages 314, 316, 318. The initiator 302 then sends END messages 326 to the participants 302, 304. The exemplary END messages 326 are one way messages and do not have responses.

As the above example illustrates, the initiator 302 can push control of message dependencies onto the participants 304, 305 by including checkpoints 307, 317 in the batch. The initiator 302 is guaranteed that the START message 306 will execute to completion before the synchronous message 308 executes even though the initiator 302 does not receive a response to the START message 306. Similarly, the initiator 302 can send the three asynchronous messages 314, 316, 318 without waiting for responses and still be guaranteed that the first asynchronous message 314 and the second asynchronous message 316 will execute to completion before the third asynchronous message 318 is executed. Thus, the transaction 300 can include message dependencies without substantially increasing the overall time of the transaction 300.

III. Distributed File System Example

Figure 4A:
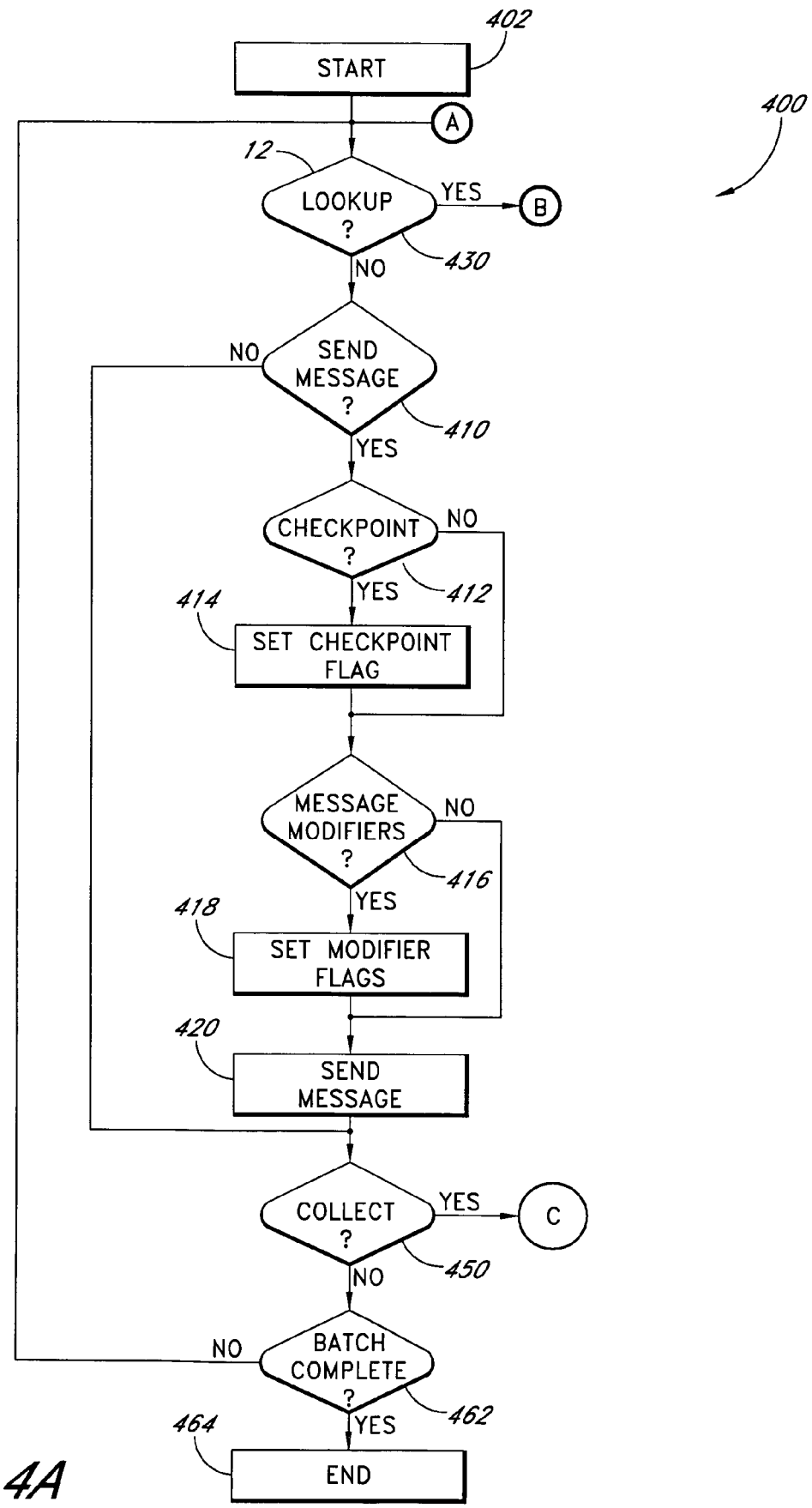
FIGS. 4A-4C are a flow chart of a process usable by an initiator node to manage a transaction between nodes according to an embodiment of the invention.
Figure 4B:
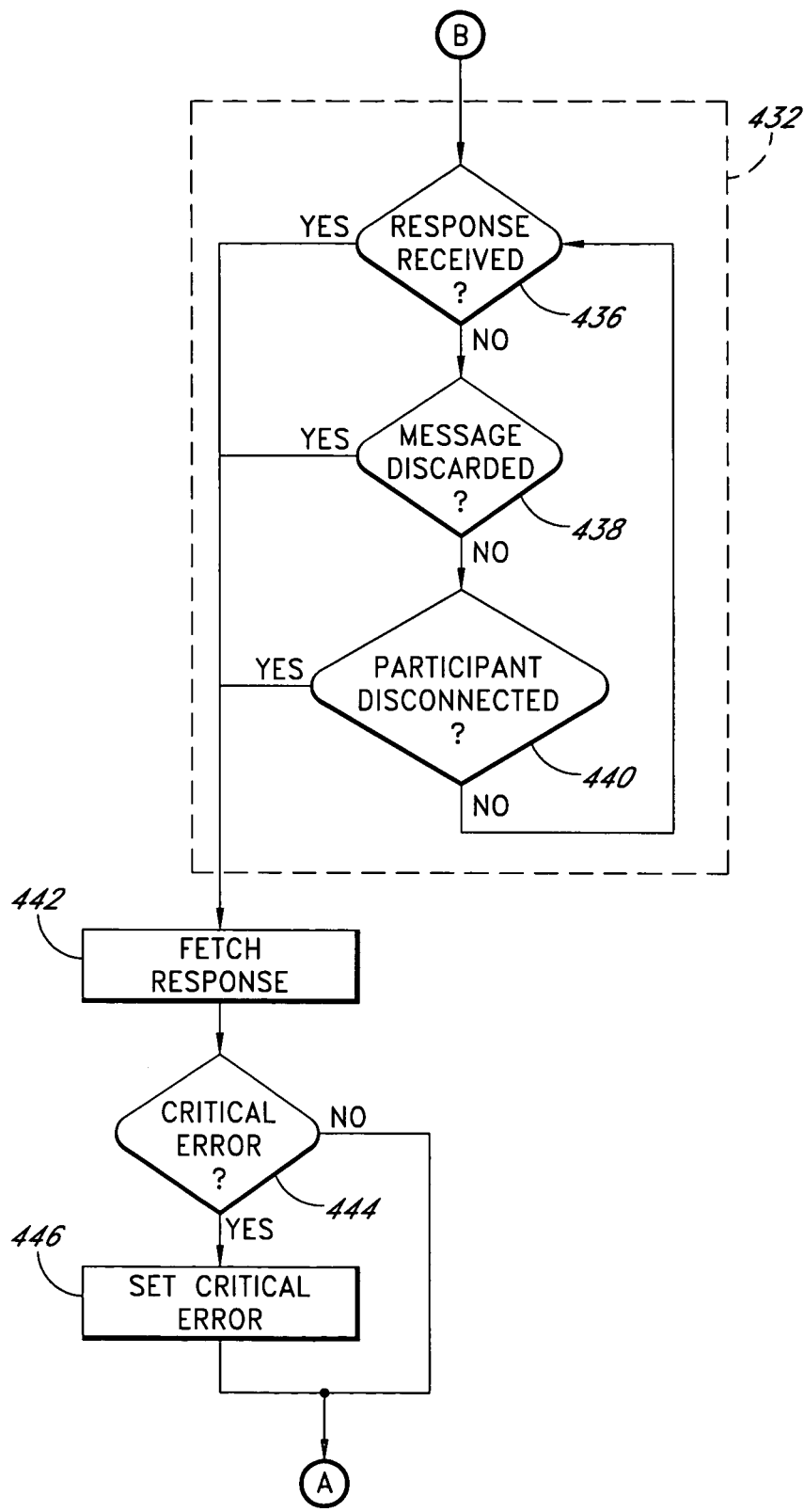
Figure 4C:
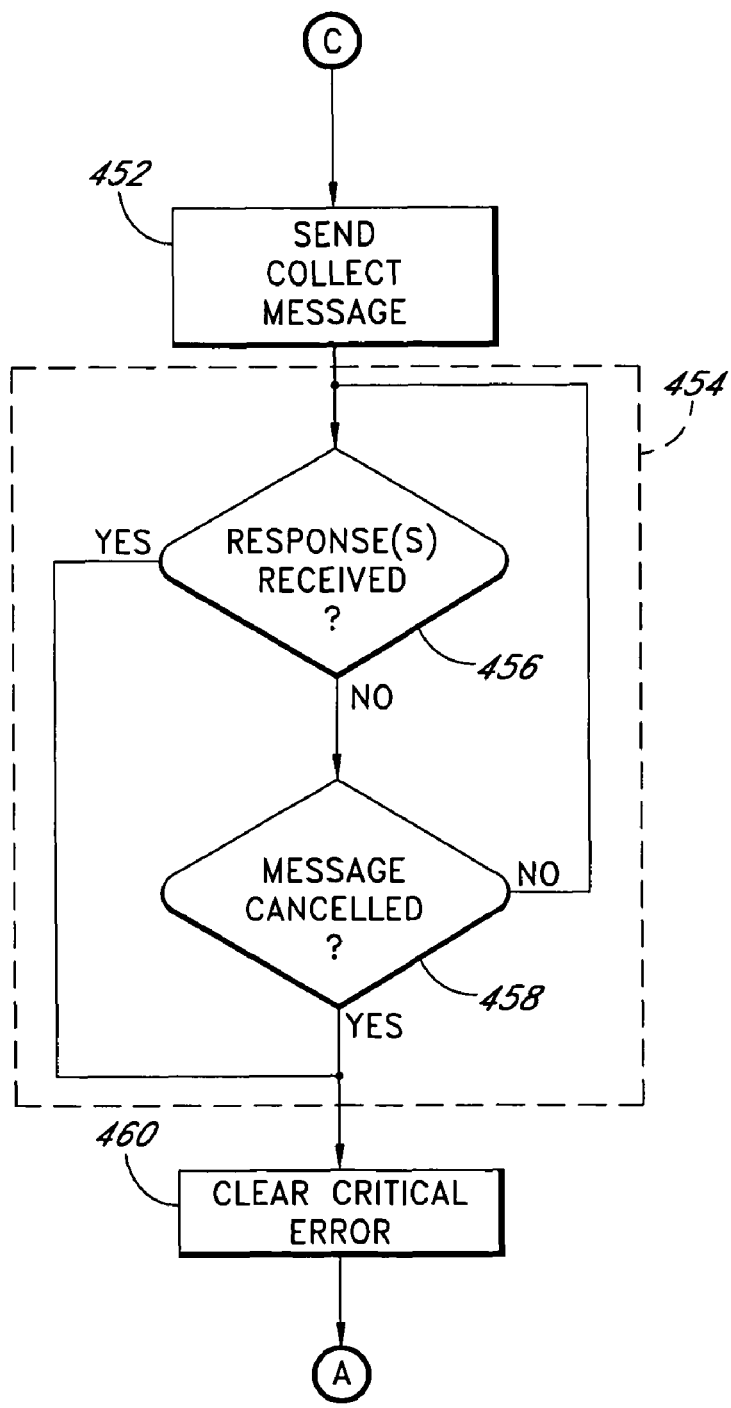
Figure 5:
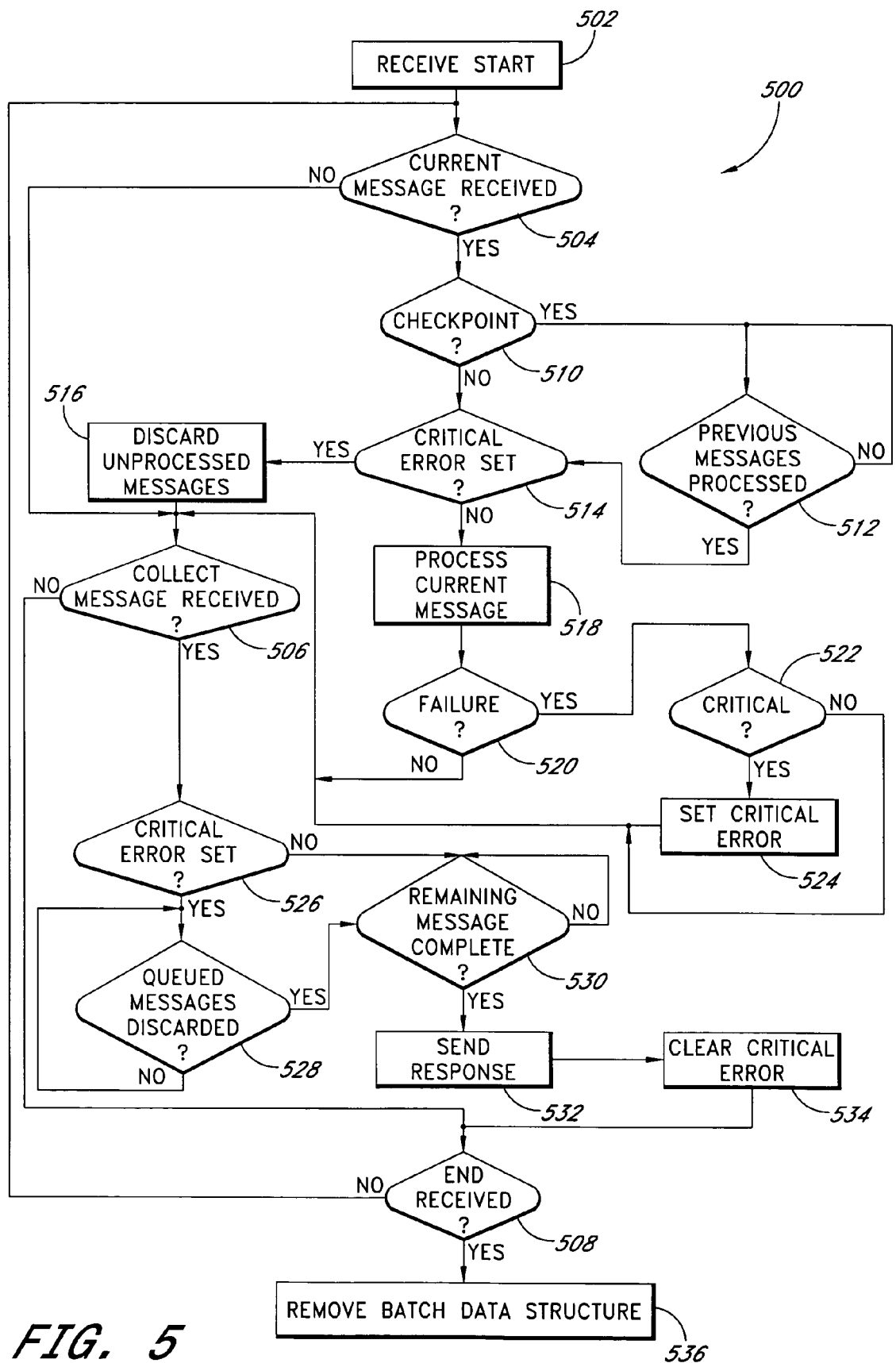
FIG. 5 is a flow chart of a process usable by a participant node in a transaction between nodes.

In one embodiment, the message batching system may be used in a distributed file system, such as the systems described in U.S. patent application Ser. No. 10/007,003, filed Nov. 9, 2001 which claims priority to Application No. 60/309,803 filed Aug. 3, 2001, and U.S. patent application Ser. No. 10/714,326, filed Nov. 14, 2003, which claims priority to Application No. 60/426,464, filed Nov. 14, 2002, all of which are hereby incorporated herein by reference in their entirety. For example, the message batching system may be used to determine if write commands to the distributed nodes have executed without any failures before the original copies of the write data are deleted from the system. As another example, the message batching system may be used to ensure that the location of error correction data related to the write data has been stored before allowing reads to that data. FIGS. 4A-4C (collectively, "FIG. 4") and FIG. 5 illustrate exemplary processes according to one embodiment of the invention for sending messages among nodes in a distributed file system, such as the distributed file system described in U.S. patent application Ser. No. 10/007,003, filed Nov. 9, 2001. For illustrative purposes, FIGS. 4 and 5 are discussed below in relation to exemplary pseudocode. Further, corresponding pseudocode examples can be found in the attached Appendix which forms a part of the patent application. It should be recognized, however, that the exemplary pseudocode is not meant to limit the scope of the invention, but only to provide details for a specific embodiment.

The nodes in the distributed file system comprise smart storage units that each comprise a remote block manager (RBM) configured to send RPC messages over a network using a reliable protocol such as TCP. As used herein, an "update-RPC" message is sent one-way with no response and an "RPC" message is an asynchronous or synchronous message that expects a response. For a particular transaction, one node acts as an initiator to start, end and collect a message batch. There are also one or more participant nodes that receive and execute the messages in the batch using "dev_lo-cal" message handlers. The one or more participant nodes may also send responses back to the initiator. The initiator may also be a participant in the transaction.

A. Initiator Process

FIG. 4 illustrates a process 400 usable by an initiator to manage a transaction between nodes. In a block 402, the initiator starts a batch. The initiator creates an empty batch with the following function:

int rbm_batch_start(rbm_batch_id_t*bidp);

wherein the bidp parameter points to a unique identifier generated by the RBM and stored in a preallocated memory location. The bidp parameter, also referred to as the batch identifier or bid, is used in all further operations in the batch.

Once the batch has been created in the block 402, the initiator may then select whether to send a message in the batch in a block 410, lookup message responses in a block 430 or collect message responses in a block 450. An artisan will recognize from the disclosure herein that the initiator's RBM may be configured to select the sequence that these blocks 410, 430, 450 are executed according to the particular transaction being performed by the batch.

In the block 410, the initiator may select to send a message in the batch, wherein the process 400 proceeds to a block 412. In the block 412, the initiator queries whether a checkpoint precedes the message in the batch. If yes, the initiator sets a checkpoint by calling the following function:

int rbm_batch_checkpoint(rbm_batch_id_t bid);

wherein bid is the returned identifier from the rbm_batch_start function. In this example, setting a checkpoint flag in the message in a block 414 sets the checkpoint.

In a block 416, the initiator queries whether there are additional message modifiers (i.e., other than the checkpoint flag). As discussed above, the additional message modifiers may include, for example, flags to mark the message as critical, as a message that should always be run, as a message that should always be sent, or the like. In one embodiment, all messages are marked as critical by default. In a block 418, the initiator sets the modifier flags.

The initiator may also check to see if any prior critical errors have cleared before sending messages. This check may be performed in the process 400, for example, anytime before the send message block 420. If prior critical errors have cleared, the initiator may proceed to block 420 and send the message. If not, then the initiator may wait until the critical error has cleared before sending any more messages. In other embodiments, the initiator may continue to send non-critical messages, but wait until the critical error is cleared before sending any critical messages.

In a block 420, the initiator sends the message by calling the following:

```
struct rbm_batch_slot_id_t {
    efs_devid_t   devid;
    efs_seqno_t   seqno;
};
int rbm_batch_FOO(rbm_batch_id_t bid, efs_devid_t devid,
    struct rbm_batch_slot_id_t *slot_id, u_int opts,
    in_args..);
``` wherein the bid is the returned identifier from the rbm_batch_start function, devid is a device identifier of the destination (i.e., participant node) where the message is to be sent, and in_args define the arguments for the FOO message being sent. As discussed below, the slot_id parameter points to a preallocated memory area where a unique identifier is stored that is later used to lookup data returned by the message. Since update-RPC messages do not return data that needs to be fetched later, they do not have slot_id parameters.

The opts parameter is used to set the additional message modifier flags discussed above and may be any combination of the following:

```
/* Turn off marking the message "critical" (default: on) */
#define RBMB_NONCRITICAL  0x0001
#define RBMB_ALWAYS_RUN   0x0002
#define RBMB_ALWAYS_SEND  0x0004.
```

Since update_RPC messages do not have responses to communicate a success or failure back to the initiator, they cannot be marked as critical and the opts parameter is omitted. However, in one embodiment, an update_RPC message can be made critical by changing it to an RPC message and discarding the response portion of the RPC message on the participant. This saves a round trip for messages where the normal response is not needed to proceed but an indication of success or failure is desired.

In the block 430, the initiator may select the option of looking up responses to message in the batch by calling the function:

```
int rbm_batch_lookup_FOO(rbm_batch_id_t bid,
    struct rbm_batch_slot_id_t *slot_id,
    int *response_code, out_args..);
``` wherein this lookup function fills out_args with the message response slot identified by the <bid, slot_id> token and frees the batch's internal storage associated with the slot_id. Until the lookup function is called, the response messages are held in the batch as a chain of mbufs in the order they arrived over the network.

If the message response has not yet arrived when the lookup function is called, the RBM will stay in a block 432 until the response is received in a block 436, the initiator receives notification that the message was discarded (for example, due to a critical error) in a block 438 or the participant disconnects from the network in a block 440. In a block 442, the lookup function fetches the message response and in a block 444 queries whether the response indicates that a critical error has occurred. If a critical error has occurred, the RBM sets a critical error condition in the initiator and new calls to rbm_batch_FOO will fail immediately. As discussed above, in some embodiments, if a critical error has occurred, the initiator may continue to send non-critical messages, but wait for the critical error to clear before sending critical messages.

In the block 450, the initiator may select the option of collecting the batch, wherein the process 400 proceeds to a block 452. In the block 452, the initiator sends a collect message to the participants by calling the following function:

```
int rbm_batch_collect(rbm_batch_id_t bid);
``` wherein the bid parameter is the returned identifier from the rbm_batch_start function. The RBM will stay in a block 454 until the initiator has received all RPC message responses in a block 456 or the initiator has received notification that RPC messages where no responses have been received were canceled due to a critical failure in a block 458. In a block 460, the RBM clears the critical error condition in the initiator. In one embodiment, if an rbm_batch_FOO function is called before an in-progress rbm_batch_collect function returns, the rbm_batch_FOO function will not execute until the collect is complete.

In a block 462, the process 400 queries whether the batch is complete. If yes, the initiator executes the following function:

```
int rbm_batch_end(rbm_batch_id_t bid);
``` wherein the bid parameter is the returned identifier from the rbm_batch_start function. In one embodiment, this function will not execute until all messages on all participants are complete. The function then removes the associated data structures on all nodes so that the batch can no longer be operated on and invalidates the bid parameter.

B. Participant Process

FIG. 5 illustrates a process 500 usable by a participant in a transaction between nodes. In a block 502, the participant receives a start message from the initiator. The start message includes the bid parameter discussed above to uniquely identify the batch. Once the batch has been opened, the participant determines whether a current message has been received in a block 504, whether a collect message has been received in a block 506, or whether an end message has been received in a block 508.

If a current message has been received in the block 504, the process 500 queries in a block 510 whether current message includes a checkpoint flag. If yes, the process proceeds to a block 512 wherein it waits until the previously received messages, if any, have been processed. If the checkpoint flag was not set in the current message or the previous messages have been processed, the process proceeds to a block wherein it queries whether a critical error condition has been set in the participant. If yes, the process 500 discards unprocessed messages, if any, in a block 516.

If a critical error condition is not set in the participant, the participant processes the current message in a block 518. In a block 520, the participant queries whether the current message failed. If yes, in a block 522, the participant queries whether a critical error flag is set in the current message. If the critical error flag is set, process 500 sets the critical error condition in the participant.

If the collect message has been received in the block 506, the process 500 queries in a block 526 whether the critical error condition is set in the participant. If the critical error condition is set in the participant, the process 500 waits in a block 528 until queued messages, if any, on or in-transit to the participant have been discarded. In some embodiments, if the critical error condition is set in the participant, the process 500 allows non-critical messages to remain active (for example, to remain in the queue) and only discards critical messages. In a block 530, the process queries whether all remaining messages on the participant are complete. If yes, the process 500 sends all outstanding message responses to the initiator in a block 532 and clears the critical error condition, if one exists, in the block 534.

If an end message has been received in the block 508, the process proceeds to a block 536 wherein the participant removes data structures corresponding to the batch and invalidates the bid parameter.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

APPENDIX

This Appendix forms a part of the patent application Ser. No. 11/262,314 entitled "MESSAGE BATCHING WITH CHECKPOINTS SYSTEMS AND METHODS".

This Appendix includes exemplary pseudocode for a remote block manager module (rbm) configured to send messages over a network between an initiator node and one or more participant nodes. It should be recognized, however, that the exemplary pseudocode is not meant to limit the scope of the invention, but only to provide details for a specific embodiment. This Appendix includes the Appendices incorporated by reference above from U.S. Provisional Application No. 60/623,848, filed Oct. 29, 2004 entitled "Message Batching with Checkpoints Systems and Methods," and U.S. Provisional Application No. 60/628,528, filed Nov. 15, 2004 entitled "Message Batching with Checkpoints Systems and Methods," which are hereby incorporated by reference herein in their entirety.

```
Generic (initiator and participant) pseudo-code:
  efsidp_dispatch
    if msg.hdr.batch_id != 0
      if msg is response
        /* initiator side */
        rbm_lbatch_addresp(dev, mbuf)
      else
        /* participant side */
        efsidp_dispatch_rbatch_msg(dev, mbuf)
      return
    else
      [existing dispatch code path]
  disconnect_cb(ctx, dev)
    /* Take care of initiator side - batches to dev */
    foreach batch in g_lbatch
      if not (batch.devs contains dev)
        continue
      foreach batch_msg_ctx in batch.dev.msg_ht
        if not ctx.mbuf
          ctx.discarded = 1
          wakeup ctx
      batch.dev.need_collect = 0
      batch.dev.wait_count = 0
      wakeup(batch.dev.wait_count);
    /* Take care of participant side - batches from dev */
    foreach batch in g_rbatch
      if dev is not initiator
        continue
      rbm_rbatch_end(dev, bid)
initiator (aka "local") pseudo-code:
  rbm_batch_start(bidp)
    batch = alloc new lbatch
    batch.id = get next g_lbatch id (never zero)
    add_to_hash(g_lbatch.batch_ht, batch.id, batch)
  rbm_batch_FOO(bid, devid, slot_id, opts, in_args..)
    batch_ctx.flags = 0
    batch_ctx.bid = bid
    rbmd_usable(devid)
    if error
      return
    seqno = rbmd_next_seq(devid)
    /* CRITICAL is on by default */
    if (!(opts & RBMB_NONCRITICAL))
      batch_ctx.flags |= IDP_BATCH_CRITICAL
    /* slot_id NULL if this is an "update-rpc" message */
    rbm_lbatch_addmsg(bid, dev, slot_id, seqno, type,
        &batch_ctx.flags)
    if error
      return
    efsidp_foo(devid, seqno, batch_ctx, in_args..)
    if error
      rbm_lbatch_cancelmsg(bid, dev, slot_id, seqno)
  rbm_lbatch_addmsg(bid, dev, slot_id, seqno, type, flags)
    batch = rbm_lbatch_lookup(bid)
    if dev not in batch
      alloc and add batch_dev to batch
    flags |= batch.dev.next_msg_flags
    batch.dev.next_msg_flags = 0
    if batch.critical_error && !(flags & CLEAR_ERROR)
      return ECANCELED
    if (slot_id)
      /* getting a response */
      zero slot_id
      /* Add msg to batch's msg_ht */
      batch_msg_ctx = alloc;
      add_to_hash(batch.dev.msg_ht, seqno, batch_msg_ctx)
      slot_id.dev = dev
      slot_id.seqno = seqno
      /* having a slot implies SEND_RESPONSE */
      flags |= IDP_BATCH_SEND_RESPONSE
      /* inc count of responses to wait for in collect */
      batch.dev.wait_count++
    else
      /* we must send a collect message */
      batch.dev.need_collect = 1
  rbm_lbatch_cancelmsg(bid, dev, slot_id, seqno)
    batch = rbm_lbatch_lookup(bid)
    if (slot_id)
      batch_msg_ctx = del_from_hash(batch.dev.msg_ht, seqno)
      free batch_msg_ctx
      rbm_lbatch_dec_wait_count(batch, dev)
      zero slot_id
  rbm_lbatch_addresp(dev, mbuf)
    seqno = hdr.seqno
    bid = hdr.batch_id
    flags = hdr.batch_flags
    batch = rbm_lbatch_lookup(bid)
    batch_msg_ctx = find_in_hash(batch, seqno)
    if error
      free mbuf
      return error
    if flags & CRITCAL_ERROR
      batch.critical_error = 1
    /* TODO flags & CANCEL? how to handle new any-msg-resp? */
    batch_msg_ctx.mbuf = mbuf
    /* unblock any lookup_FOO for this message */
    wakeup(batch_msg_ctx)
    rbm_lbatch_dec_wait_count(batch, dev)
  rbm_lbatch_dec_wait_count(batch, batch_dev)
    batch_dev.wait_count--
    if 0 eq batch_wait_count
      /* unblock any collects */
      wakeup batch_dev.wait_count
  rbm_batch_checkpoint(bid)
    batch = rbm_lbatch_lookup(bid)
    foreach dev in batch
      batch.dev.next_msg_flags |= CHECKPOINT
  /* Only generated for "rpc" messages */
  rbm_batch_lookup_FOO(bid, slot_id, response_code, out_args..)
    response_code = 0
    /* may block */
    rbm_lbatch_lookup_resp(bid, slot_id, &mbuf)
    if error
      return error
    mbuf_istream_init(mis, mbuf, hdr.size)
    rbm_response_code = FOO_resp_unmarshal(mis,
        &response_code, ..)
    mbuf_istream_clean(mis)
  rbm_lbatch_lookup_resp(bid, slot_id, mp)
    *mp = 0
    dev = slot_id.dev
    if dev == 0
      return EINVAL
    batch = rbm_lbatch_lookup(bid)
    batch_msg_ctx = get_from_hash(batch.dev.msg_ht,
        slot_id.seqno)
    if error
      error = ENOENT
      goto out_unlock
    while !batch_msg_ctx.mbuf && !batch_msg_ctx.discarded
```

```
        sleep(batch_msg_ctx, batch->lock)
        del_from_hash(batch.dev.msg_ht, slot_id.seqno)
        if batch_msg_ctx.discarded
            error = ECANCELED
            goto out_unlock
        /* pass raw response data back to caller */
        mp = &batch_msg_ctx.mbuf
    out_unlock:
        free batch_msg_ctx
    rbm_batch_collect(bid)
        rbm_batch_collect_flags(bid, 0)
    rbm_batch_collect_flags(bid, flags)
        batch = rbm_lbatch_lookup(bid)
        /* send collect messages or wait for msg responses */
        /* will be no bigger than this */
        slots = alloc slots * (n devs in batch)
        n_coll = 0;
        foreach dev in batch
            /* always clear error on collect */
            batch.dev.next_msg_flags |= CLEAR_ERROR
            /*
             * CLEAR_ERROR implies checkpoint - we want to be
             * sure everything before the next msg has completed.
             */
            batch.dev.next_msg_flags |= CHECKPOINT
            if batch.dev.need_collect
                rbm_batch_batch_collect(bid, dev,
                    &slots[n_coll], 0);
                n_coll++
            else if batch.dev.wait_count
                /* all msgs have responses, wait for them */
                while batch.dev.wait_count
                    sleep(batch.dev.wait_count, batch.lock)
        /* wait for any collect message responses */
        i = 0
        foreach dev in batch
            if batch.dev.need_collect
                ASSERT(i < n_coll)
                error = lookup_batch_collect(bid,
                    &slots[i], &code)
                if (error || code == ECRITFAIL)
                    batch.critical_error = 1
                batch.dev.need_collect = 0
                i++
        if batch.critical_error
            error = ECRITFAIL
            batch.critical_error = 0
        return error
    rbm_batch_end(bid)
        batch = rbm_lbatch_lookup(bid)
        /* force sending a collect message */
        foreach dev in batch
            batch.dev.need_collect = 1
        rbm_batch_collect_flags(bid, FINAL)
        /* continue even if rbm_batch_collect fails */
        remove from g_lbatch
        free batch
Participant (aka "remote") pseudo-code:
    efsidp_dispatch_rbatch_msg(dev, mbuf)
        seqno = hdr.seqno
        bid = hdr.batch_id
        flags = hdr.batch_flags
        if not batch = rbm_rbatch_lookup(dev, bid)
            batch = rbm_rbatch_start(dev, bid)
        if flags & CHECKPOINT
            rbm_rbatch_inc_cp(batch)
            /* clear flag - don't do it again if !canrun */
            hdr.batch_flags &= ^CHECKPOINT
        batch.cp_last.msg_cnt++
        if rbm_rbatch_canrun(batch, batch.cp_last)
            if flags & CLEAR_ERROR
                batch.critical_error = 0
            if batch.critical_error
                if flags & SEND_RESPONSE
                    TODO new any-resp fail msg
                m_freem(mbuf)
                rbm_rbatch_msg_done(dev, bid)
                return
            /* construct batch_ctx for response */
            batch_ctx.batch_id = bid
            batch_ctx.flags = flags;
            if g_msg_info[hdr->type].own_thread
                efsidp_dispatch_thread(dev, mbuf,
                    batch_ctx)
            else
                result = handle_FOO(dev, mbuf, batch_ctx)
        else
            append mbuf to batch.cp_last.pending
    rbm_rbatch_start(dev, bid)
        batch = alloc new rbatch(M_ZERO)
        batch.id = bid
        batch.dev = dev
        batch_uid = pack(dev, bid)
        add_to_hash(g_rbatch.batch_ht, batch_uid, batch)
        /* alloc cp 0 */
        rbm_rbatch_inc_cp(batch)
    rbm_rbatch_lookup(dev, bid)
        batch_uid = pack(dev, bid)
        get_from_hash(g_rbatch.batch_ht, batch_uid)
    rbm_rbatch_inc_cp(batch)
        alloc new cp
        cp.id = batch.next_cp_id
        batch.next_cp_id++
        add_to_hash(batch.cp_ht, cp)
        batch.cp_last = cp
        rbm_rbatch_advance_cp(batch)
    rbm_rbatch_advance_cp(batch)
        while (batch.cp_active.msg_cnt == 0) and
            (batch.cp_active != batch.cp_last)
            wakeup batch.cp_active
            batch.cp_active = get_from_hash(batch.cp_ht,
                batch.cp_active.id + 1)
            ASSERT(batch.cp_active)
    rbm_rbatch_canrun(batch, cp)
        if batch.cp_active.id eq cp.id
            return true
        /* implies batch.cp_active.id < cp.id */
        return false
    rbm_rbatch_msg_done(dev, batch_ctx, result)
        batch = rbm_rbatch_lookup(dev, ctx.bid)
        if result and batch_ctx.flags & CRITICAL
            batch.critical_error = 1
        rbm_rbatch_dec_cp_msg(dev, batch)
        if ctx.flags & FINAL
            rbm_rbatch_end(dev, bid)
    rbm_rbatch_dec_cp_msg(batch)
        ASSERT(batch.cp_active.msg_cnt)
        batch.cp_active.msg_cnt--
        old_cp = batch.cp_active
        rbm_rbatch_advance_cp(batch)
        /* if we advanced the cp, kick off processing */
        if old_cp != batch.cp_active
            work.action = DWT_BATCH
            work.data.bid = batch.id
            dwt_dispatch(work)
    rbm_rbatch_end(dev, bid)
        batch = rbm_rbatch_lookup(bid)
        while batch.cp_last.msg_cnt
            msleep(batch.cp_last, batch.lock)
        remove_from_hash(g_rbatch.dev, batch.id)
        free batch
    dev_local_batch_collect(dev, seq_no, batch_ctx, bid)
        if not batch = rbm_rbatch_lookup(dev, bid)
            send ENOENT
        /*
         * if we're running, then our collect cp must have been
         * reached, so all we have to do is return the status.
         * the initiator guarantees no more messages have been
         * added to this checkpoint until it receives this collect
         * response.
         */
        if batch.critical_error
            response = ECRITFAIL
        /* discard batch_ctx to undo munging in efsidp_dispatch */
        efsidp_batch_collect_resp(dev, seq_no, NULL, response);
    efsidp_FOO_resp(dev, seqno, batch_ctx, args...)
        ...
        batch_id = 0
        batch_flags = 0
        if batch_ctx
```

```
    batch_id = batch_ctx.batch_id
    if response_code and batch_ctx.flags & CRITICAL
        batch_flags |= CRITICAL_ERROR
    if not batch_ctx or batch_ctx.flags & SEND_RESPONSE
        efsid_send(id, type, mos, gi, seqno, batch_ctx)
    if batch_ctx
        rbm_rbatch_msg_done(ctx.dev, ctx.batch_ctx, result)
    ...
dwt_main
    ...
    for (;;) {
        ...
        case DWT_BATCH:
            rbm_batch_dwt_dispatch(dev, work.bid)
        ...
rbm_batch_dwt_dispatch(dev, bid)
    batch = rbm_rbatch_lookup(dev, bid)
    mbuf = pop(batch.cp_active.mbuf)
    /* One at a time, please */
    efsidp_dispatch_rbatch_msg(dev, mbuf)
    /* More to do? Interleave with other dwt work */
    if batch.cp_active.mbuf
        work.action = DWT_BATCH
        work.data.bid = batch.id
        dwt_dispatch(work)
```

The following is in the IDP (Isilon Device Protocol) header packet:

```
struct efsid_header {
    ...
    rbm_batch_id_t    batch_id;
    u_int8_t          batch_flags;
};
```

Where batch_flags may be:

```
#define IDP_BATCH_CRITICAL          0x01
#define IDP_BATCH_CRITICAL_ERROR    0x02
#define IDP_BATCH_CHECKPOINT        0x04
#define IDP_BATCH_CLEAR_ERROR       0x08
#define IDP_BATCH_SEND_RESPONSE     0x10
#define IDP_BATCH_FINAL             0x20
```

The following is a pointer parameter to all efsidp_FOO, efsidp_FOO_resp and dev_local_FOO functions:

```
struct efsidp_batch_ctx {
    rbm_batch_id_t    batch_id;
    u_int8_t          batch_flags;
};
```

New RBM message for batch collection. Batch ID etc transmitted via efsid_header. Note this is *not* a batchable message, but can be treated like one when processed by the participant.

```
rpc batch_collect {
    callers:    async;
    handler:    async;
    group-info: none;
    options:    thread, response-refcount, proto-open;
    args {
        rbm_batch_id_t    batch_id;
```

```
    }
    response {
        int               response_code;
        response-code:    response_code;
    }
}
```

Generic resp (new type)—
New RBM message sent in the following cases:
    when a CRITICAL message with no SEND_RESPONSE fails
    when any type of incoming message with SEND_RESPONSE is discarded on the remote side due to an error occurring on a previous CRITICAL message
This message will take the following format:

```
update-rpc rpc_cancel {
    group-info: none;
    args {
        efs_seqno_t       rpc_seqno;      # must be set
        rbm_batch_id_t    batch_id;       # zero to ignore
        int               response_code;
    }
}
```

What is claimed is:

1. A distributed system comprising:
a first storage unit comprising at least one processor;
a second storage unit in communication with the first storage unit, the second storage unit comprising at least one processor;
wherein the at least one processor of the first storage unit is configured to:
    group messages together into a batch that may be operated on as a whole, each message comprising a command;
    send the messages to the second storage unit and allow the second storage unit to control the order in which commands in the messages are executed;
    send a checkpoint message to the second storage unit, the checkpoint message comprising a checkpoint; and
    send a collect message to the second storage unit requesting a result of executing any commands in the messages; and
wherein the at least one processor of the second storage unit is configured to:
    receive the messages from the first storage unit;
    receive a checkpoint message;
    detect the checkpoint;
    when the checkpoint is detected, asynchronously execute to completion the unexecuted commands in the messages of the batch received prior to receipt of the checkpoint message before beginning execution of commands in the messages of the batch received after receipt of the checkpoint message, wherein the unexecuted messages of the batch received prior to receipt of the checkpoint message do not include a checkpoint and the commands in the messages of the batch can be executed without first sending a response and waiting for a next message to arrive; and
    return a response message to a collect message received from the first storage unit, the response message comprising the results of two or more commands in the messages, the two or more commands having completed execution after receipt of any previous collect message.

2. The distributed system of claim 1, wherein the at least one processor of the first storage unit is further configured to set an error flag in one or more messages, and wherein if one of the one or more messages with a set error flag fails, the first storage unit cancels transmission of subsequent messages to the second storage unit.

3. The distributed system of claim 1, wherein the at least one processor of the second storage unit is further configured to:
   detect a set error flag in one or more of the messages; and
   discard messages with unexecuted commands if the command in the one or more messages with a set error flag fails.

4. The distributed system of claim 1, wherein the checkpoint message is one of the messages of the batch having a checkpoint.

5. A method for coordinating transactions performed by participating nodes in a network, the method comprising:
   grouping messages together into a batch, the grouping performed by a first processor of a first node, each message comprising a command;
   sending each of a first set of messages of the batch from the first node to a second node and allowing the second node to control the order in which commands in the first set of messages are executed, the second node comprising a second processor;
   sending a checkpoint message from the first node to the second node, the checkpoint message comprising a checkpoint;
   after sending the checkpoint message, sending each of a second set of messages of the batch from the first node to the second node;
   sending a collect message from the first node to the second node after sending each of the first set of messages and the checkpoint message, the first set of messages comprising two or more messages of the batch, the collect message requesting at least an indication that the commands in the first set of messages were executed;
   receiving each of the first set of messages from the first node at the second node;
   receiving the checkpoint message from the first node at the second node;
   detecting the checkpoint, the detection performed by the second processor;
   receiving each of the second set of messages from the first node at the second node;
   when the checkpoint is detected, asynchronously executing to completion the unexecuted commands in the first set of messages before beginning execution of commands in the second set of messages, wherein the first set of messages does not include a checkpoint; and
   sending a response to the collect message from the second node to the first node, the response comprising at least an indication that the commands in each of the two or more messages in the first set of messages were executed, the two or more messages having completed execution after receipt of any previous collect message.

6. The method of claim 5, further comprising setting an error flag in one or more of the messages, the setting performed by the first processor of the first node.

7. The method of claim 6, further comprising canceling transmission of subsequent messages from the first node to the second node if one of the one or more messages with a set error flag fails.

8. The method of claim 6, further comprising discarding messages with unexecuted commands received by the second node if one of the one or more messages with a set error flag fails.

9. The method of claim 5, wherein the checkpoint message is one of the messages of the batch having a checkpoint.

10. A message participant system comprising:
    a plurality of nodes, each node configured to:
       receive a plurality of first messages, wherein each of the first messages may comprise a command and the node controls the order in which commands in the plurality of first messages are executed;
       receive a last message, wherein the last message comprises one or more commands and a checkpoint, the checkpoint indicating that any commands in the plurality of first messages should execute before any command in the last message;
       execute the unexecuted commands in the plurality of first messages substantially in parallel;
       after the commands in the plurality of first messages have completed execution, execute any commands in the last message;
       receive a collect message after receiving each of the first messages and the last message, the collect message requesting at least an indication that the commands in the first set of messages and the commands in the last message were executed; and
       respond to the collect message, the response comprising at least an indication that the commands in the first set of messages and the commands in the last message were executed, the first set of messages and the last message having completed execution after receipt of any previous collect message;
    wherein the plurality of first messages does not include a checkpoint.

11. The message participant system of claim 10, wherein at least one of the plurality of first messages and the last message includes an error flag.

12. The message participant system of claim 11, wherein the error flag indicates that if a command in the corresponding message fails, messages that have not yet been processed should be discarded.

* * * * *